United States Patent
Nalepa

(10) Patent No.: US 8,568,514 B1
(45) Date of Patent: Oct. 29, 2013

(54) SORBENT COMPOSITIONS AND PROCESSES FOR REDUCING MERCURY EMISSIONS FROM COMBUSTION GAS STREAMS

(71) Applicant: Albemarle Corporation, Baton Rouge, LA (US)

(72) Inventor: Christopher J. Nalepa, Zachary, LA (US)

(73) Assignee: Albemarle Corporation, Baton Rouge, LA (US)

( * ) Notice: Subject to any disclaimer, the term of this patent is extended or adjusted under 35 U.S.C. 154(b) by 0 days.

(21) Appl. No.: 13/948,313

(22) Filed: Jul. 23, 2013

Related U.S. Application Data

(62) Division of application No. 13/063,349, filed as application No. PCT/US2009/058133 on Sep. 24, 2009, now Pat. No. 8,518,154.

(60) Provisional application No. 61/099,851, filed on Sep. 24, 2008.

(51) Int. Cl.
 *B01D 53/02* (2006.01)
(52) U.S. Cl.
 USPC ............................................. 95/134; 96/134
(58) Field of Classification Search
 USPC ............................................. 95/134; 96/134
 See application file for complete search history.

(56) References Cited

U.S. PATENT DOCUMENTS

| | | |
|---|---|---|
| 2006/0048646 A1 | 3/2006 | Olson et al. |
| 2007/0140943 A1 | 6/2007 | Comrie |
| 2007/0168213 A1 | 7/2007 | Comrie |
| 2007/0179056 A1 | 8/2007 | Baek et al. |
| 2008/0121142 A1 | 5/2008 | Comrie et al. |
| 2009/0010828 A1 | 1/2009 | Holmes et al. |
| 2010/0251938 A1 | 10/2010 | Comrie |

FOREIGN PATENT DOCUMENTS

| | | |
|---|---|---|
| CN | 101175692 | 5/2008 |
| GB | 1424076 | 2/1976 |
| JP | 11033397 | 2/1999 |
| JP | 2008533432 | 8/2008 |
| JP | 2008537587 | 9/2008 |
| WO | 2006099611 | 9/2006 |
| WO | 2006101499 | 9/2006 |

OTHER PUBLICATIONS

Zeid, et al; "Activated Carbon Adsorption in Oxidizing Environments"; Water Research, Elsevier, Amsterdam, NL; vol. 29, No. 2; Feb. 1, 1995.

Wiegler, et al; "Removing Trihalomethanes from DI Water. A Consideration of the Alternatives"; Engineering Information, Inc.; New York, NY; vol. 8, No. 10; Oct. 1990.

*Primary Examiner* — Christopher P Jones
(74) *Attorney, Agent, or Firm* — Marcy M. Hoefling; James A. Jubinsky; Nathan C. Dunn

(57) ABSTRACT

Compositions, and processes utilizing such compositions, are provided for reducing mercury emissions from combustion gases. Such compositions comprise a sorbent and a brominated organic compound.

2 Claims, No Drawings

SORBENT COMPOSITIONS AND PROCESSES FOR REDUCING MERCURY EMISSIONS FROM COMBUSTION GAS STREAMS

BACKGROUND

In 2005, the EPA issued the Clean Air Mercury Rule to cap and reduce mercury emissions from coal-fired power plants. This rule, combined with the EPA's Clean Air Interstate Rule (CAIR) or other rules, may require significant reduction in mercury emissions from coal-fired power plants in the U.S. as early as 2010.

Significant coal resources exist around the world that have the potential to satisfy much of the world's energy needs for a long period of time. The U.S. has large amounts of low-sulfur coal sources, e.g. Powder River basin coal in Wyoming and Montana, but such sources contain non-negligible amounts of mercury in both the elemental and oxidized forms. Thus, some type of mercury emission mediation technology is necessary in order for coal-fired energy plants to utilize such sources of coal without substantial mercury emissions.

The Department of Energy has presented information from several studies that indicate mercury emissions during combustion of coal fuels can be lowered by treatment of the coal fuel stocks with low levels of bromine.

Brines that are produced in several areas of the world contain substantial quantities of bromide salts, such as sodium bromide. Bromine can be recovered from such brines by treatment with chlorine to oxidize the bromide to bromine. Processes for electrolytic conversion of bromide to bromine are also known; but electrolytic conversion is an expensive alternative to the aforedescribed process. Catalytic oxidation of bromide to bromine by use of oxygen or air mixtures has been reported; but no successful, economic, commercial operation is in place today.

Brominated activated carbon is known for use in reducing mercury emissions from coal-fired power plants. However, production of brominated activated carbon requires the transport and handling of bromine which is corrosive and toxic. It also requires a high degree of on-site technical expertise regarding bromine handling procedures and emergency response actions.

Given the foregoing, it would be commercially beneficial to have new, commercially viable processes for minimizing mercury emissions from coal and other fuel stocks.

THE INVENTION

This invention meets the above-described needs by providing compositions and processes for reducing mercury emissions from combustion gas streams produced during combustion of coal and other combustible fuels. As used herein and in the claims, the term "reducing mercury emissions" means removing any amount of mercury from the emissions by any mechanism, e.g., adsorption or absorption, such that the amount of mercury emitted into the atmosphere upon burning of the fuel is reduced as compared to the amount that would be emitted absent use of the compositions and/or processes of this invention. Sorbent compositions of this invention can be added to a combustion gas stream resulting from combustion of a combustible fuel. Additionally, sorbent compositions of this invention can be added to (combined with) the fuel before and/or during combustion. Additionally, this invention contemplates adding sorbent compositions of this invention to the fuel before and/or during combustion and into the combustion gas. The sorbent compositions comprise a brominated organic compound and a sorbent.

Sorbent compositions according to this invention can be added to/combined with the combustible fuel and/or combustion gas stream in the form of a solid, e.g., in powder or granule form, or in the form of a liquid. The sorbent compositions can be added to a combustion gas stream that is at a temperature from about 150 deg C. to about 400 deg C. For example, in cold-side ESPs (electrostatic precipitators), injection of the sorbent composition can take place at combustion gas stream temperatures from about 150 deg C. to about 200 deg C. Or, in hot-side ESPs, injection of the sorbent composition can take place at combustion gas stream temperatures from about 300 deg C. to about 400 deg C.

Processes of this invention can comprise adding a composition comprising a brominated organic compound and a sorbent to a combustion gas stream to reduce mercury emissions from the combustion gas stream. In processes of this invention, the brominated organic compound can comprise decabromo diphenyl oxide, decabromo diphenyl ethane, ethylenebistetrabromo phthalimide, hexabromo cyclododecane, a brominated polystyrene, dibromomethane, bromochloromethane, tribromomethane (bromoform), or brominated flame retardants, and/or the sorbent can comprise a carbonaceous substrate, and/or the sorbent can comprise activated carbon, and/or the sorbent can comprise a wood-derived activated carbon, and/or the combustion gas stream can be derived from the combustion of coal, and/or the composition can have a PIO that is at least about 10 deg C. higher than the PIO of the sorbent alone.

This invention provides processes comprising adding a composition comprising a brominated organic compound and a sorbent to a combustible fuel prior to and/or during combustion of the combustible fuel. In such processes, the combustible fuel can comprise coal, and/or the sorbent can comprise a carbonaceous substrate, and/or the sorbent can comprise activated carbon, and/or the sorbent can comprise a wood-derived activated carbon or a coconut-shell derived activated carbon, and/or the brominated organic compound can comprise decabromo diphenyl oxide, decabromo diphenyl ethane, ethylenebistetrabromo phthalimide, hexabromo cyclododecane, a brominated polystyrene, dibromomethane, bromochloromethane, tribromomethane (bromoform), or brominated flame retardants, and/or the composition can have a PIO that is at least about 10 deg C. higher than the PIO of the sorbent alone.

This invention also provides compositions capable of reducing mercury emissions from a combustion gas stream, such compositions comprising a brominated organic compound and a sorbent. In such compositions, the brominated organic compound can comprise decabromo diphenyl oxide, decabromo diphenyl ethane, ethylenebistetrabromo phthalimide, hexabromo cyclododecane, a brominated polystyrene, dibromomethane, bromochloromethane, tribromomethane (bromoform), or brominated flame retardants, and/or the sorbent can comprise a carbonaceous substrate, and/or the sorbent can comprise activated carbon, and/or the sorbent can comprise a wood-derived activated carbon or a coconut-shell derived activated carbon, and/or the composition can have a PIO that is at least about 10 deg C. higher than the PIO of the sorbent alone.

This invention also provides processes comprising adding a composition comprising a brominated organic compound to a combustion gas stream to reduce mercury emissions from the combustion gas stream.

Sorbent

Sorbents that are suitable for use in this invention include, for example, activated carbon, activated charcoal, activated coke, carbon black, powdered coal, char, unburned or partially-burned carbon from a combustion process, kaolinites or other clays, zeolites, alumina, and other carbonaceous substrates. Wood-derived PACs are particularly suitable for use in this invention, including those derived from sawdust, woodchips, or other particulate wood products. Coconut shell-derived PACs are also suitable for use in this invention. Other suitable sorbents will be known, or may come to be known, to those skilled in the art and having the benefit of the teachings of this specification.

Brominated Organic Compound

Any brominated organic compound that is stable, i.e., does not release bromine, up to about 100 deg C., is suitable for use in this invention. Some example suitable compounds include brominated aromatic substrates such as decabromo diphenyl oxide, decabromo diphenyl ethane, ethylenebistetrabromo phthalimide, brominated polystyrenes, as well as brominated aliphatic substrates such as hexabromo cyclododecane, dibromomethane, bromochloromethane, tribromomethane (bromoform), n-propyl bromide and the like. In addition, the brominated organic compound of this invention can comprise certain brominated flame retardants and/or items treated with brominated flame retardants ("BFR's"). Examples include BFR's designed to readily disperse into polymers and BFR's having particle sizes tailored specifically for blending into a sorbent, such as activated carbon.

Other suitable brominated organic compound's will be known, or may come to be known, to those skilled in the art and having the benefit of the teachings of this specification.

Sorbent Compositions

Procedures for preparing sorbent compositions of this invention are simple and commercially advantageous when compared, e.g., to preparation and handling of brominated active carbon. A suitable procedure comprises dry-blending a brominated organic compound with the sorbent. When a volatile brominated organic compound is used, it can be advantageous to heat such compound in the presence of sorbent so as to adsorb the organic compound onto the sorbent. When a BFR is used, it may be advantageous to pre-mill the BFR to enhance its blending properties. Other suitable procedures for combining one or more brominated organic compounds with a sorbent, such as activated carbon, will be known, or may come to be known, to those skilled in the art and having the benefit of the teachings of this specification.

In a process according to this invention, one or more brominated organic compounds can be added to a combustion gas stream upstream to the injection of sorbent, e.g., activated carbon that has not previously been treated with the brominated organic compound; thus providing what can be termed an "instant sorbent composition". Alternatively, one or more brominated organic compounds can be added to a combustion gas stream to reduce mercury emissions without the addition of a sorbent.

Thermal Stability

Thermal stability of a substance can be assessed, e.g., via the temperature of initial energy release, a.k.a., the point of initial oxidation (PIO) of the substance. As used in this specification, including the claims, the PIO of compositions and/or sorbents of this invention is defined as the temperature at which the heat flow, as determined by DSC, is 1.0 W/g with the baseline corrected to zero at 100 deg C. A composition of this invention has improved thermal stability as compared to the sorbent that is used in such composition in that the composition has a PIO that is at least about 10 deg C. higher than the PIO of the sorbent alone. A composition of this invention can have a PIO that is at least about 10 deg C. to about 94 deg C., or about 10 deg C. to about 90 deg C., or about 10 deg C. to about 50 deg C., or about 20 deg C. to about 80 deg C., higher than the PIO of the sorbent alone.

Combustible Fuels

Processes and sorbent compositions of this invention are suitable for reducing mercury emissions in combustion gas streams resulting from combustion of any combustible fuel comprising mercury. Such combustible fuels include coal, solid or fluid waste, and other substances.

EXAMPLES

The following examples are illustrative of the principles of this invention. It is understood that this invention is not limited to any one specific embodiment exemplified herein, whether in the examples or the remainder of this patent application.

The wood-derived PAC (powdered activated carbon) (prepared by the thermal activation process) utilized in these examples was analyzed by DSC-TGA. The point of initial energy release (PIO) was 267 deg C.

For the Examples 1-3, we treated samples of the wood-derived PAC with bromochloromethane and with dibromomethane. The performance of these treated samples were compared to similar activated carbon samples treated with dichloromethane. Performance tests included DSC, which measures of the thermal properties of the activated carbon.

Example 1

Comparative Example

Preparation of Dichloromethane on PAC. A sample of wood-based powdered activated carbon (10.0 g) was treated with $CH_2Cl_2$ (0.53 g) in a closed container at 60 deg C. until completely adsorbed. Analysis of the PAC by the Shoninger combustion technique indicated a Cl content of 4.9 wt %. The PIO, as determined by DSC, was 327 deg C.

Example 2

Preparation of Bromochloromethane on PAC

Wood-based powdered activated carbon from the same source as was used in Example 1 (10.0 g) was treated with $CH_2BrCl$ (0.56 g) in a closed container at 60 deg C. until completely adsorbed. Analysis of the PAC by the Shoninger combustion technique indicated a halogen content of 4.9 wt %. Analysis by DSC indicated that the PIO was 381 C.

Example 3

Preparation of Dibromomethane on PAC

Wood-based powdered activated carbon from the same source as was used in Example 1 (10.0 g) was treated with $CH_2Br_2$ (0.55 g) in a closed container at 60 deg C. until completely adsorbed. Analysis of the PAC by the Shoninger combustion technique indicated a bromine content of 4.6 wt %. Analysis by DSC indicated that the PIO was 391 C.

For Examples 4 and 5, we treated the wood-based PAC with powdered brominated flame retardants. The stabilities of the samples were determined by DSC, which measures of the thermal properties of the activated carbon. It was surprisingly found that there was a great difference in thermal stabilities amongst the various additives. Best stability was found for HBCD followed by TBBPA.

Example 4

General Procedure for Sample Preparation

A series of treated PACs were prepared by combining wood-based PAC with various BFRs. The treatment was designed to provide a treated PAC with 5 wt % bromine value.

Example 5

Comparative Example. Treatment of PAC with Bromine

The PAC used to prepare the series of samples in Example 4 was brominated according to the process disclosed in U.S. Pat. No. 6,953,494. Elemental analysis indicated a PAC bromine content of 5 wt %.

Example 6

Thermal Stability Comparisons

The following data compares the thermal stability of the various PACs as determined by DSC. The point of initial energy release (PIO) was compared for all of the samples.

| Preparation Procedure | Bromide Source | PIO |
| --- | --- | --- |
| Example 5 (Comparative) | elemental bromine | 364 |
| Example 4a | TBBPA | 291 |
| Example 4b | HBCD | 336 |

This invention can be quite advantageous in that handling of elemental bromine is not required. Additionally, addition of a brominated organic compound to activated carbon is very facile and can be accomplished via a number of conventional solid mixing techniques. Mixing of a brominated organic compound with activated carbon typically does not require specialized materials of construction as no corrosive and hazardous halogen vapors are created or released.

Another advantage is that sorbent compositions of this invention require no activation step, i.e. after thorough mixing of activated carbon and a brominated organic compound, a sorbent composition of this invention is ready for use without subsequent treatment such as heating.

Addition of a brominated organic compound to activated carbon at low temperatures (<150 deg C.) results in no substantial absorption or uptake of bromine into the pores of the activated carbon. Thus substantially all sites remain available for adsorption of mercury in the combustion gas stream.

Unless otherwise specified, this invention is not limited to any specific embodiment(s) exemplified herein, whether in lists of suitable components or otherwise.

It is to be understood that the reactants and components referred to by chemical name or formula anywhere in the specification or claims hereof, whether referred to in the singular or plural, are identified as they exist prior to being combined with or coming into contact with another substance referred to by chemical name or chemical type (e.g., another reactant, a solvent, or etc.). It matters not what chemical changes, transformations and/or reactions, if any, take place in the resulting combination or solution or reaction medium as such changes, transformations and/or reactions are the natural result of bringing the specified reactants and/or components together under the conditions called for pursuant to this disclosure. Thus the reactants and components are identified as ingredients to be brought together in connection with performing a desired chemical reaction or in forming a combination to be used in conducting a desired reaction. Accordingly, even though the claims hereinafter may refer to substances, components and/or ingredients in the present tense ("comprises", "is", etc.), the reference is to the substance, component or ingredient as it existed at the time just before it was first contacted, combined, blended or mixed with one or more other substances, components and/or ingredients in accordance with the present disclosure. Whatever transformations, if any, which occur in situ as a reaction is conducted is what the claim is intended to cover. Thus the fact that a substance, component or ingredient may have lost its original identity through a chemical reaction or transformation during the course of contacting, combining, blending or mixing operations, if conducted in accordance with this disclosure and with the application of common sense and the ordinary skill of a chemist, is thus wholly immaterial for an accurate understanding and appreciation of the true meaning and substance of this disclosure and the claims thereof. As will be familiar to those skilled in the art, the terms "combined", "combining", and the like as used herein mean that the components that are "combined" or that one is "combining" are put into a container, e.g., a combustion chamber, a pipe, etc. with each other. Likewise a "combination" of components means the components having been put together in such a container.

While the present invention has been described in terms of one or more preferred embodiments, it is to be understood that other modifications may be made without departing from the scope of the invention, which is set forth in the claims below.

What is claimed is:

1. A composition capable of reducing mercury emissions from a combustion gas stream, the composition comprising a brominated organic compound and a sorbent, wherein the sorbent comprises a carbonaceous substrate, activated carbon, a wood-derived activated carbon, or a coconut-shell derived activated carbon, and wherein the brominated organic compound comprises decabromo diphenyl oxide, decabromo diphenyl ethane, ethylenebistetrabromo phthalimide, hexabromo cyclododecane, a brominated polystyrene, dibromomethane, bromochloromethane, tribromomethane (bromoform), or brominated flame retardants.

2. The composition of claim 1, wherein the composition has a PIO that is at least about 10 deg C. higher than the PIO of the sorbent alone.

* * * * *